(12) United States Patent
Enosawa et al.

(10) Patent No.: US 11,898,567 B2
(45) Date of Patent: Feb. 13, 2024

(54) VACUUM PUMP

(71) Applicant: Edwards Japan Limited, Chiba (JP)

(72) Inventors: Hideki Enosawa, Chiba (JP); Manabu Nonaka, Chiba (JP); Takashi Kabasawa, Chiba (JP)

(73) Assignee: Edwards Japan Limited, Chiba (JP)

( * ) Notice: Subject to any disclaimer, the term of this patent is extended or adjusted under 35 U.S.C. 154(b) by 276 days.

(21) Appl. No.: 17/436,880

(22) PCT Filed: Mar. 9, 2020

(86) PCT No.: PCT/JP2020/009952
§ 371 (c)(1),
(2) Date: Sep. 7, 2021

(87) PCT Pub. No.: WO2020/184504
PCT Pub. Date: Sep. 17, 2020

(65) Prior Publication Data
US 2022/0163041 A1 May 26, 2022

(30) Foreign Application Priority Data

Mar. 14, 2019 (JP) .................... 2019-047815
Mar. 5, 2020 (JP) .................... 2020-037519

(51) Int. Cl.
*F04D 27/00* (2006.01)
*F04D 19/04* (2006.01)

(52) U.S. Cl.
CPC ......... *F04D 27/001* (2013.01); *F04D 19/042* (2013.01)

(58) Field of Classification Search
CPC .............................. F04D 27/001; F04D 19/042
See application file for complete search history.

(56) References Cited

FOREIGN PATENT DOCUMENTS

| JP | H06101655 A | 4/1994 |
|----|-------------|--------|
| JP | H06109409 A | 4/1994 |

(Continued)

OTHER PUBLICATIONS

PCT International Search Report dated Jun. 2, 2020 for corresponding PCT application Serial No. PCT/JP2020/009952, 2 pages.

(Continued)

*Primary Examiner* — Justin D Seabe
*Assistant Examiner* — John S Hunter, Jr.
(74) *Attorney, Agent, or Firm* — Theodore M. Magee; Westman, Champlin & Koehler, P.A.

(57) ABSTRACT

A deposited material sensor is arranged, in a flow path of a gas from an inlet port to an outlet port, on an upstream side or a downstream side of a predetermined flow path position where a cause of disruption to operation of the vacuum pump is to occur. In addition, the deposited material sensor detects a presence or absence of deposited material at the arrangement position of the deposited material sensor, and the arrangement position of the deposited material sensor is a position where a thickness of the deposited material at the predetermined flow path position assumes a predetermined thickness that corresponds to a maintenance time of maintenance for suppressing the cause when a detection state of the deposited material sensor changes from deposited material absent to deposited material present.

6 Claims, 10 Drawing Sheets

(56) References Cited

FOREIGN PATENT DOCUMENTS

| JP | H07008590    |   | 2/1995  |           |
|----|--------------|---|---------|-----------|
| JP | 2001132684 A | * | 5/2001  |           |
| JP | 2001132684 A |   | 5/2001  |           |
| JP | 2004117091 A | * | 4/2004  | F04D 19/04 |
| JP | 2011247823 A |   | 12/2011 |           |
| JP | 2018159632 A |   | 10/2018 |           |
| WO | 2018173704 A1 |  | 9/2018  |           |

OTHER PUBLICATIONS

PCT International Written Opinion dated Jun. 2, 2020 for corresponding PCT application Serial No. PCT/JP2020/009952, 4 pages.
European Communication dated Nov. 11, 2022 and Supplementary European Search Report dated Nov. 3, 2022 for corresponding European application Serial No. EP20769211.

* cited by examiner

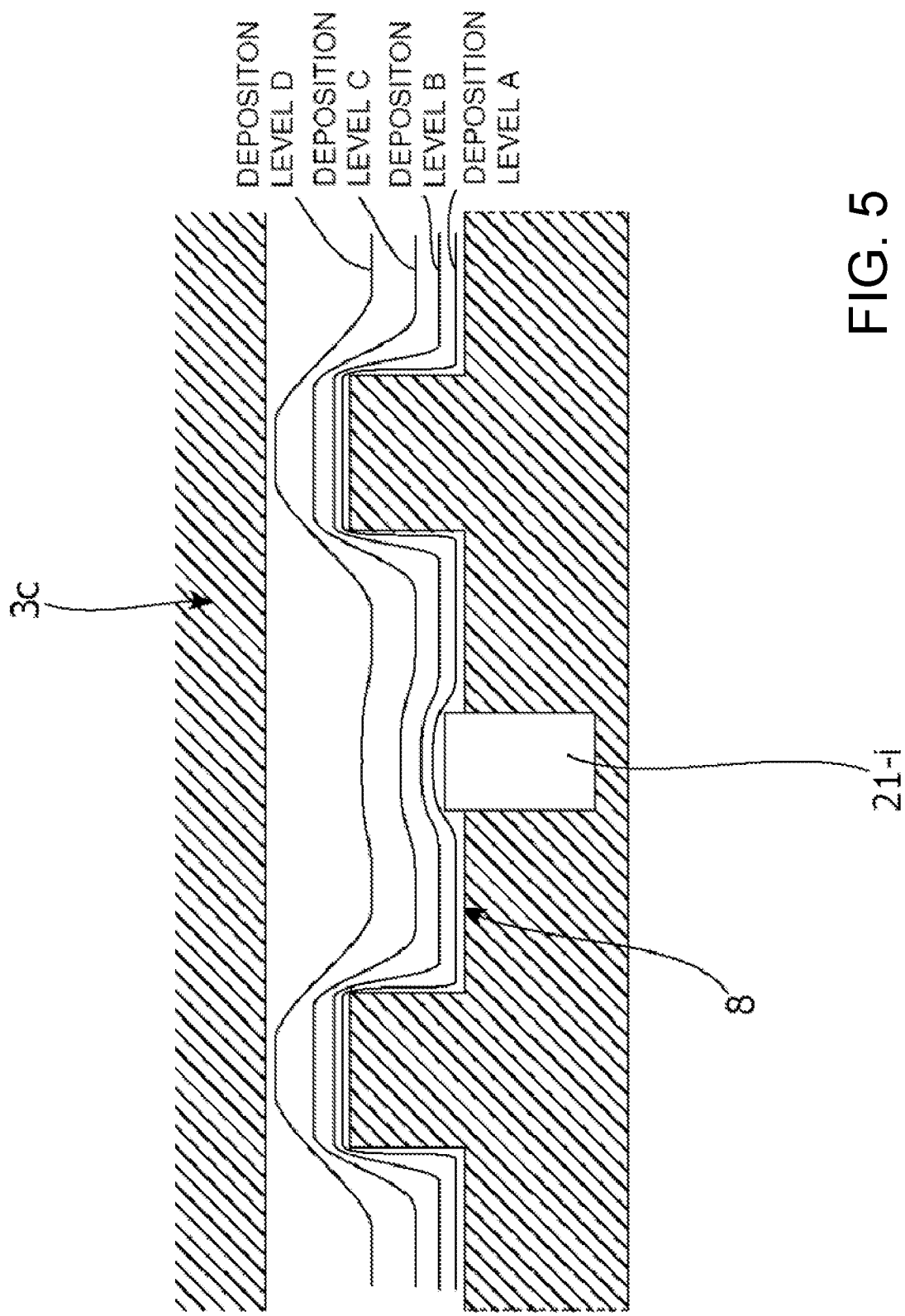

VACUUM PUMP

CROSS-REFERENCE OF RELATED APPLICATION

This application is a Section 371 National Stage Application of International Application No. PCT/JP2020/009952, filed Mar. 9, 2020, which is incorporated by reference in its entirety and published as WO 2020/184504A1 on Sep. 17, 2020 and which claims priority of Japanese Application No. 2019-047815, filed Mar. 14, 2019 and Japanese Application No. 2020-037519, filed Mar. 5, 2020.

BACKGROUND

The present invention relates to a vacuum pump.

A reactor used in semiconductor manufacturing or the like uses a vacuum pump to exhaust a powdered reaction product, a gaseous reaction product, a gaseous reaction raw material, and the like. Reaction products and the like exhausted from the reactor travel along a flow path inside the vacuum pump. In doing so, depending on conditions of temperature and pressure, the reaction products and the like become deposited on a wall surface inside the flow path by adhering thereto and precipitating thereon. Since an increase in the deposited material disrupts operation of the vacuum pump, maintenance for removing such deposited material must be performed.

In a given vacuum pump, a thickness of such deposited material is measured by a capacitance film thickness sensor and, based on a sensor output value of the film thickness sensor, maintenance is executed before a disruption of operation of the vacuum pump occurs (for example, refer to Japanese Patent Application Laid-open No. H06-101655 and Japanese Patent Application Laid-open No. H06-109409).

In another vacuum pump, a thickness of deposited material deposited between a pair of electrodes is detected to have reached a predetermined thickness when an increase rate of capacitance of the electrode pair drops (for example, refer to Japanese Patent Application Laid-open No. 2018-159632).

In yet another vacuum pump, a communicating path is provided in a flow path, and deposited material is detected based on a variation in pressure that is detected by a pressure sensing portion provided in the communicating path (for example, refer to Japanese Patent Application Laid-open No. 2011-247823).

The discussion above is merely provided for general background information and is not intended to be used as an aid in determining the scope of the claimed subject matter. The claimed subject matter is not limited to implementations that solve any or all disadvantages noted in the background.

SUMMARY

In a flow path inside a vacuum pump, the lower the temperature and the higher the pressure, the more readily deposited material precipitates. Generally, the further downstream along the flow path, the higher the pressure. As far as temperature is concerned, a part of the flow path may be heated by a heater in order to suppress an occurrence of deposited material.

On the other hand, in order to increase an operation rate of a vacuum pump, the less frequently maintenance is performed, the better. Therefore, a maintenance time is preferably detected as late as possible insofar as operation of the vacuum pump is not disrupted.

However, it is difficult to detect, at a flow path position where a cause (blockage of the flow path by deposited material, the deposited material coming into contact with a rotating part, or the like) of a disruption to operation of the vacuum pump is to occur, a thickness of the deposited material just before the cause occurs (in other words, an appropriate maintenance time).

In other words, in order to detect a thickness of deposited material in a vertical direction with respect to a wall surface of a flow path, for example, while electrodes must be installed at two opposing positions on the wall surface of the flow path in a case of a capacitance system, it is difficult to install the electrodes when one wall surface is rotating. In addition, it is also difficult to accurately detect a thickness of the deposited material (for example, a thickness of the deposited material just before blockage) based on pressure inside the flow path as described earlier. Furthermore, when providing a capacitance thickness gauge inside a flow path, spacing between a pair of electrode plates must be widened in order to measure, with good sensitivity, a relatively large thickness that corresponds to an appropriate maintenance time. However, when the spacing between electrode plates is widened, since increasing an area of the electrode plates in order to realize favorable sensitivity causes a size of a sensor to increase, it becomes difficult to arrange the sensor inside the flow path.

The present invention has been made in consideration of the problems described above and an object thereof is to obtain a vacuum pump that enables, at a flow path position where a cause of a disruption to operation of the vacuum pump is to occur, a thickness of deposited material just before the cause occurs to be detected.

A vacuum pump according to the present invention includes: a flow path of a gas from an inlet port to an outlet port; and a deposited material sensor that is arranged, in the flow path, on an upstream side or a downstream side of a predetermined flow path position where a cause of disruption to operation of the vacuum pump is to occur. In addition, the deposited material sensor detects a presence or absence of deposited material at the arrangement position of the deposited material sensor, and the arrangement position of the deposited material sensor is a position where a thickness of the deposited material at the predetermined flow path position assumes a predetermined thickness that corresponds to a maintenance time of maintenance for suppressing the cause when a detection state of the deposited material sensor changes from deposited material absent to deposited material present.

According to the present invention, a vacuum pump is obtained which enables, at a flow path position where a cause of a disruption to operation of the vacuum pump is to occur, a thickness of deposited material just before the cause occurs to be detected.

These and other objects, features, and advantages of the present invention will become more apparent from the following detailed description when considered together with the accompanying drawings.

The Summary is provided to introduce a selection of concepts in a simplified form that are further described in the Detail Description. This summary is not intended to identify key features or essential features of the claimed subject matter, nor is it intended to be used as an aid in determining the scope of the claimed subject matter.

BRIEF DESCRIPTION OF THE DRAWINGS

FIG. 5 is a diagram for explaining a deposition level of deposited material in a deposited material sensor;

DETAILED DESCRIPTION

Hereinafter, embodiments of the present invention will be described with reference to the drawings.

First Embodiment

Figure 1:
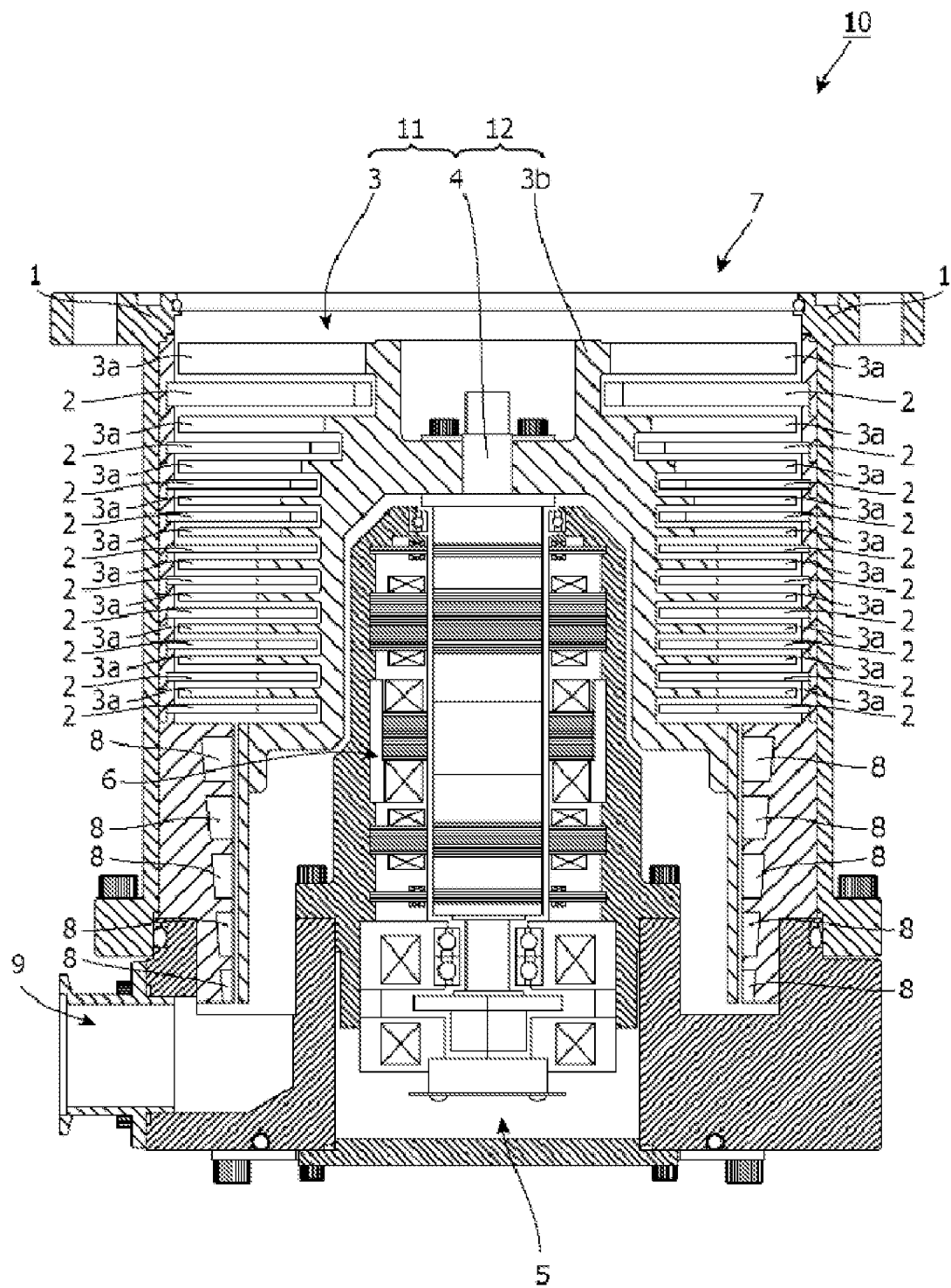
FIG. 1 is a diagram showing an internal configuration of a vacuum pump according to a first embodiment of the present invention.

FIG. 1 is a diagram showing an internal configuration of a vacuum pump according to a first embodiment of the present invention. The vacuum pump shown in FIG. 1 is a turbo-molecular pump and includes, in a vacuum pump main body 10, a casing 1, a stator blade 2, a rotor blade 3, a rotor shaft 4, a bearing portion 5, a motor portion 6, an inlet port 7, a thread groove 8, and an outlet port 9. The rotor blade 3 is fixed to the rotor shaft 4, and the rotor blade 3 and the rotor shaft 4 constitute a rotor 11.

The casing 1 has an approximately cylindrical shape, houses the rotor 11, the bearing portion 5, the motor portion 6, and the line in an internal space thereof, and has a plurality of stages of the stator blade 2 fixed to an inner circumferential surface thereof. The stator blade 2 is arranged at a predetermined elevation angle. The casing 1 and the stator blade 2 constitute a stator.

Inside the casing 1, a plurality of stages of a rotor blade portion 3a and a plurality of stages of the stator blade 2 are alternately arranged in a height direction of the rotor shaft (a rotor shaft direction height). The rotor blade 3 includes a plurality of stages of the rotor blade portion 3a and a rotor cylindrical portion 3b. Each rotor blade portion 3a extends from the rotor cylindrical portion 3b and has a predetermined elevation angle. A range of the rotor cylindrical portion 3b extends to an end of a rotor blade portion 3a (a first-stage rotor blade portion 3a) that is closer to a center of the rotor 11 in a radial direction. In other words, the rotor cylindrical portion 3b is a portion other than the rotor blade portion 3a among the rotor blade 3. In addition, the rotor shaft 4 and the rotor cylindrical portion 3b constitute a rotor central portion 12. Therefore, the rotor central portion 12 ranges from a center of the rotor 11 to an end of the rotor blade portion 3a (the first-stage rotor blade portion 3a) that is closer to a center of the rotor 11 in the radial direction. The rotor shaft 4 and the rotor blade 3 are connected to each other by screwing or the like.

The bearing portion 5 is a bearing of the rotor shaft 4 and, in the present embodiment, a magnetic levitation bearing including a sensor that detects a deviation of the rotor shaft 4 in an axial direction and the radial direction and an electromagnet that suppresses a deviation of the rotor shaft 4 in the axial direction and the radial direction. It should be noted that a bearing system of the bearing portion 5 is not limited to magnetic levitation. The motor portion 6 rotates the rotor shaft 4 using electromagnetic force.

The inlet port 7 is an upper end opening portion of the casing 1 and has a flange shape, and is connected to a chamber (not illustrated) or the like. A gas particle comes flying into the inlet port 7 from the chamber or the like due to thermal motion or the like. The outlet port 9 has a flange shape and exhausts a gas particle having been sent from the rotor blade portion 3a and the stator blade 2 or the like.

While the vacuum pump shown in FIG. 1 is a composite blade vacuum pump provided with a thread groove pump portion made of a thread groove 8 in a stage subsequent to a turbo-molecular pump portion made up of the stator blade 2 and the rotor blade portion 3a described above, alternatively, the vacuum pump may be a full blade vacuum pump.

In the vacuum pump shown in FIG. 1, a flow path of a gas to be exhausted is from the inlet port 7 to the outlet port 9 and includes the inlet port 7, a space between the rotor 11 and a stator (the stator blade 2 and the casing 1), a space between the thread groove 8 of the thread groove pump portion and the rotor 11, and the outlet port 9.

In addition, the vacuum pump shown in FIG. 1 includes a deposited material sensor that is arranged, in the flow path, on an upstream side or a downstream side of a predetermined flow path position where a cause of disruption to operation of the vacuum pump such as described above is to occur.

The deposited material sensor detects a presence or absence of deposited material at the arrangement position of the deposited material sensor, the arrangement position of the deposited material sensor being a position where a thickness of the deposited material at the predetermined flow path position assumes a predetermined thickness (hereinafter, referred to as a maintenance time thickness) that corresponds to a maintenance time of maintenance for suppressing the cause described above when a detection state of the deposited material sensor changes from deposited material absent to deposited material present.

In addition, the deposited material sensor is arranged on a wall surface of a flow path in the stator that opposes the rotor 11. For example, the deposited material sensor is arranged on a bottom surface of the thread groove 8 in the thread groove pump portion, a stator wall surface that opposes the rotor blade portion 3a, or the like.

Furthermore, the predetermined flow path position described above is, for example, an outlet portion of the thread groove pump portion. It should be noted that, for example, when a heater for suppressing deposited material is arranged, the predetermined flow path position described above may be a portion other than a portion heated by the heater.

Figure 2A:
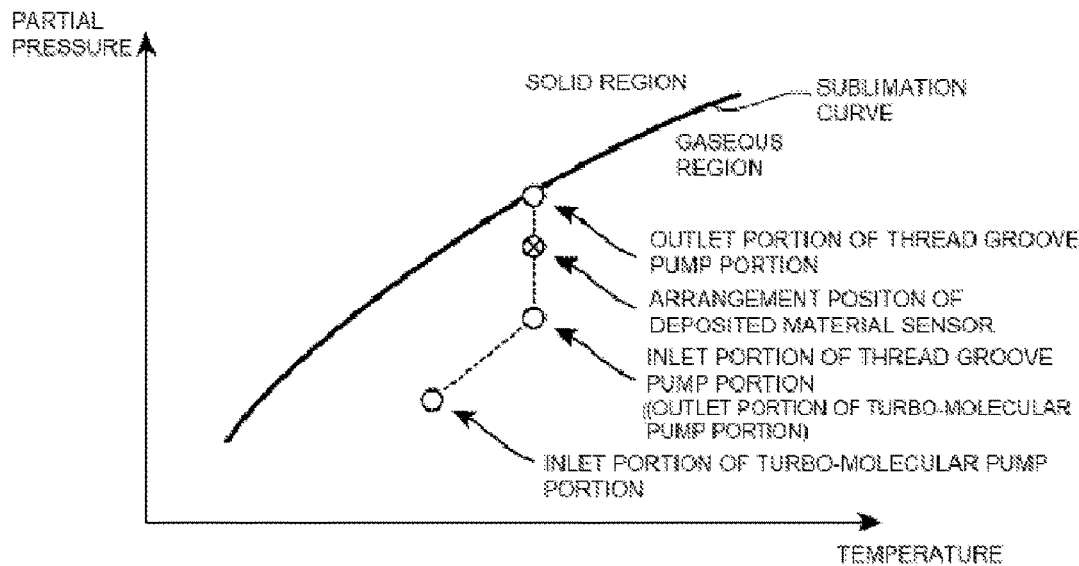
FIGS. 2A and 2B are phase diagrams for explaining precipitation of a deposited material component.
Figure 2B:
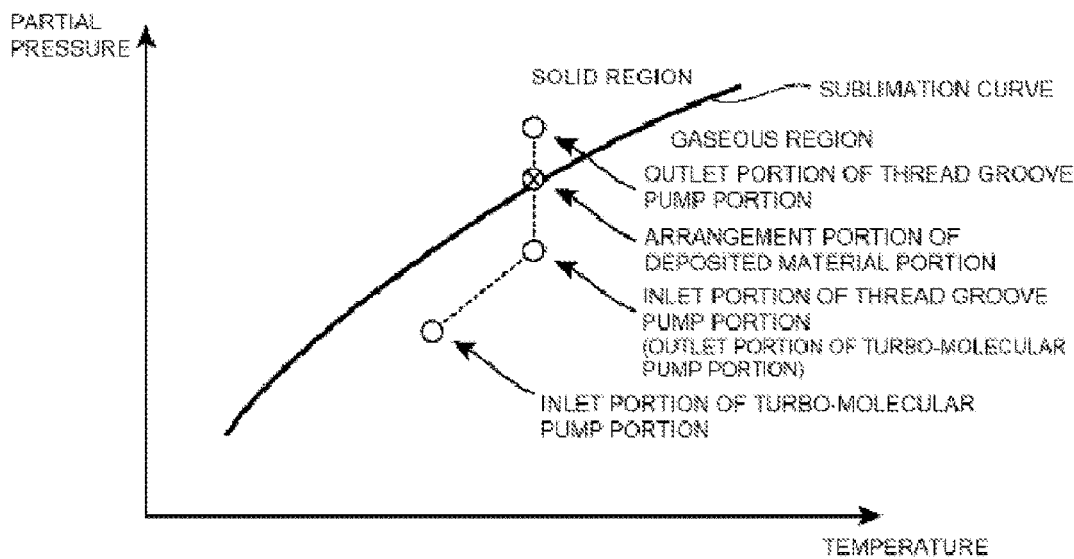

FIGS. 2A and 2B are phase diagrams for explaining precipitation of a deposited material component (a component which is included in a gas to be exhausted and which precipitates as deposited material). FIG. 2A is a phase diagram showing a state of a deposited material component at each flow path position immediately after start of operation, and FIG. 2B is a phase diagram showing a state of the deposited material component at each flow path position after a predetermined operation time elapses.

With respect to a given deposited material component, as shown in FIG. 2A, at a time point of start of operation of the vacuum pump, while a state of the deposited material component at an output portion of the thread groove pump portion is near a sublimation curve and deposited material readily precipitates, in an inlet portion of the thread groove pump portion (an outlet portion of the turbo-molecular pump) and an inlet portion of the turbo-molecular pump, partial pressure is sufficiently low, a state of the deposited material component is in a gaseous region that is separated from a sublimation curve, and deposited material does not readily precipitate. At this time point, the state of the deposited material component at the arrangement position of the deposited material sensor is in a gaseous region and deposited material does not readily precipitate.

Subsequently, as operation time of the vacuum pump elapses, deposited material precipitates in the outlet portion of the thread groove pump portion, and when the flow path gradually becomes narrower due to the deposited material, partial pressure on an upstream side thereof (the inlet portion of the thread groove pump portion (the outlet portion of the turbo-molecular pump), the inlet portion of the turbo-molecular pump, and the arrangement position of the deposited material sensor) gradually rises and the state of the deposited material component at the arrangement position of the deposited material sensor approaches a sublimation curve as shown in FIG. 2B. Therefore, at this time point, deposited material precipitates at the arrangement position of the deposited material sensor and a detection state of the deposited material sensor changes to deposited material present. In other words, the deposited material sensor is arranged at a position where the state of the deposited material component is approximately on the sublimation curve when the thickness of the deposited material in the outlet portion of the thread groove pump portion assumes a thickness that corresponds to maintenance time.

Figure 3:
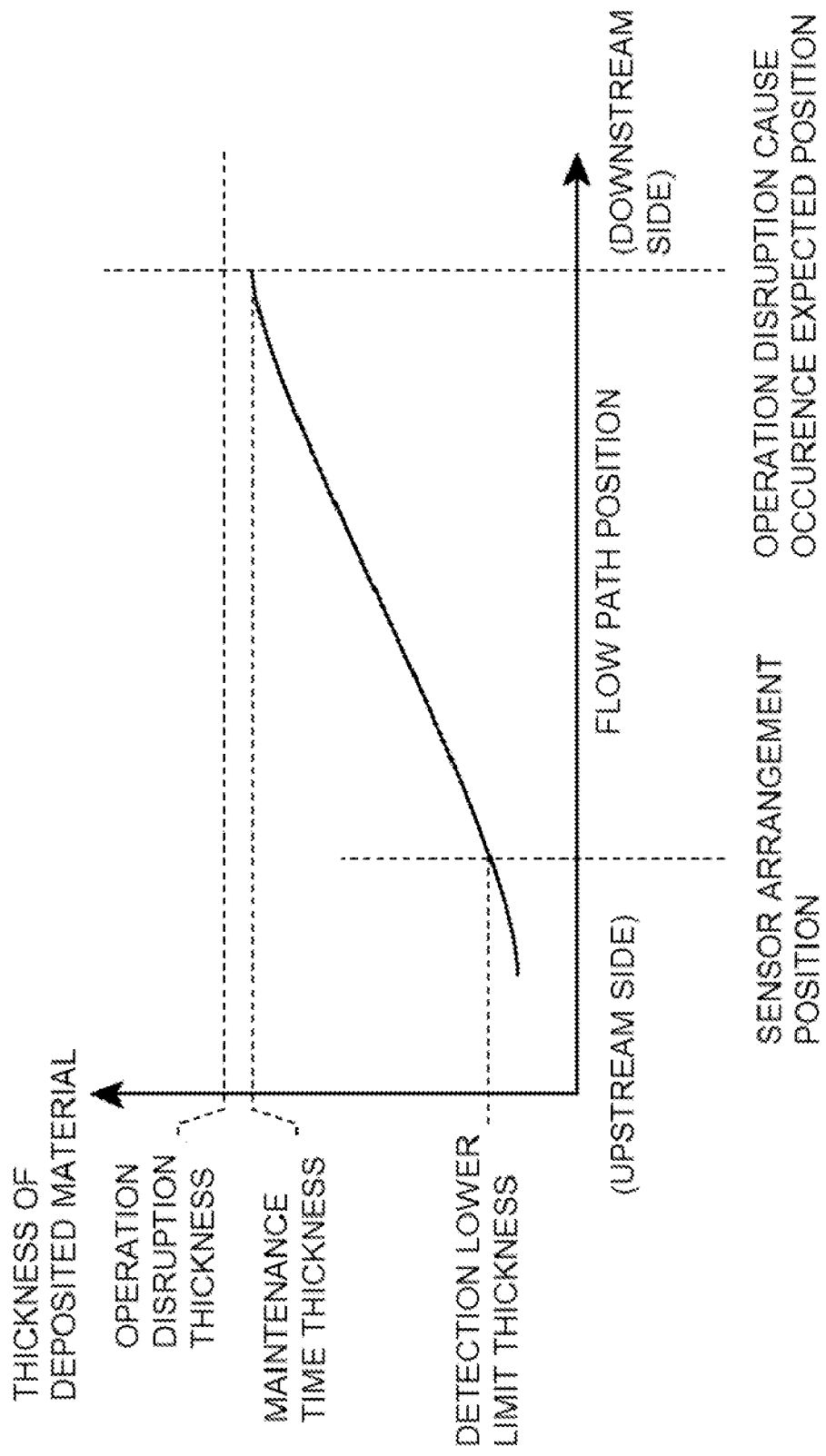
FIG. 3 is a diagram for explaining a distribution of thickness of deposited material along a flow path position.

FIG. 3 is a diagram for explaining a distribution of thickness of deposited material along a flow path position. Since the thickness of the deposited material increases as pressure increases, as shown in FIG. 3, the deposited material sensor is arranged at a position where the thickness of the deposited material assumes a thickness of the deposited material that is a detection lower limit of the deposited material sensor (a predetermined thickness of the deposited material that is lower than the maintenance time thickness (in other words, a thickness obtained by subtracting a margin from a thickness at which a disruption to operation occurs)) when the thickness of the deposited material at a cause occurrence expected position (the predetermined flow path position described above) reaches the maintenance time thickness.

Figure 4A:
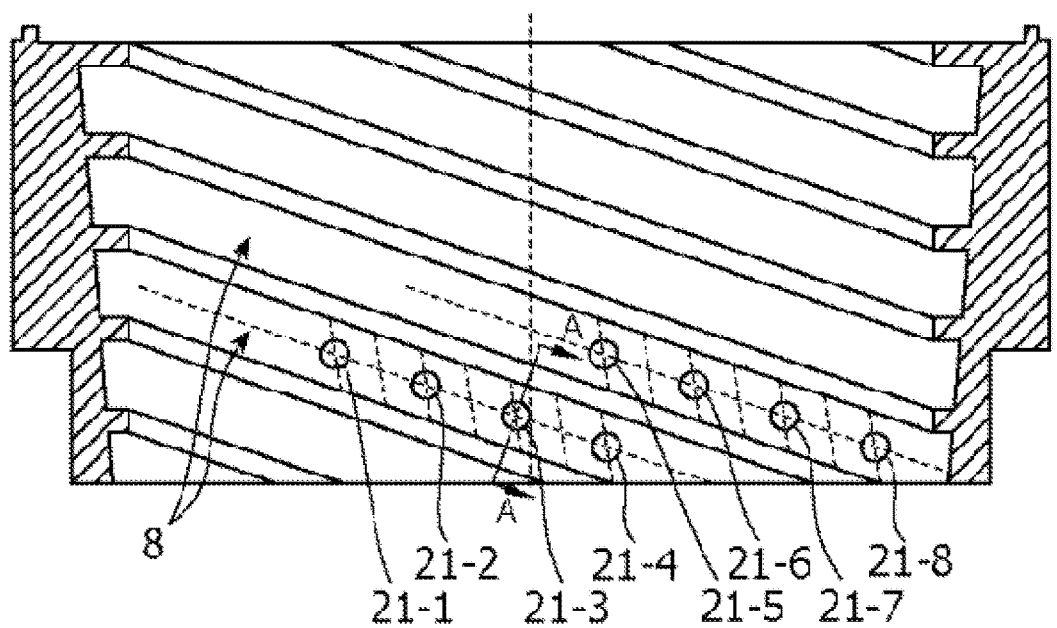
FIGS. 4A and 4B are diagrams showing an example of an arrangement position of a deposited material sensor in the first embodiment.
Figure 4B:
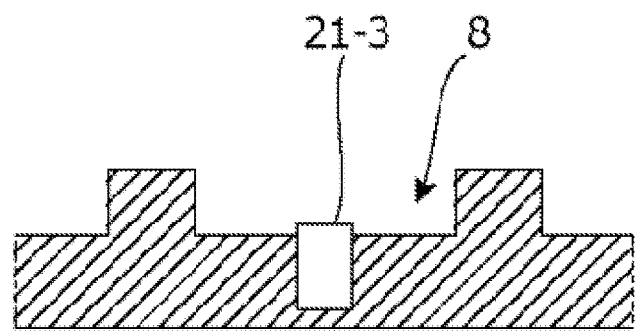

FIGS. 4A and 4B are diagrams showing an example of an arrangement position of the deposited material sensor in the first embodiment. FIG. 4A is a sectional view of the thread groove pump portion in the first embodiment, and FIG. 4B is a sectional view of the thread groove pump portion taken along A-A in FIG. 4A.

In the first embodiment, a plurality of deposited material sensors 21-1 to 21-N (N>1) are arranged in the flow path. For example, as shown in FIGS. 4A and 4B, the deposited material sensors 21-1 to 21-4 are arranged at regular intervals along a thread groove 8, and the deposited material sensors 21-5 to 21-8 are arranged at regular intervals along another thread groove 8. In addition, as shown in FIG. 4B, each deposited material sensor 21-$i$ is arranged in, for example, a center portion of a bottom surface of the thread groove 8.

One of the plurality of deposited material sensors 21-1 to 21-N is used as a deposited material sensor that is arranged on an upstream side or a downstream side of a predetermined flow path position where a cause of disruption to operation of the vacuum pump such as described above is to occur. Each of the plurality of deposited material sensors 21-1 to 21-N detects a presence or absence of deposited material at the arrangement position of the deposited material sensor.

In this case, each deposited material sensor 21-$i$ is a photoelectronic sensor such as an infrared sensor, and when an end portion of the deposited material sensor 21-$i$ that protrudes into the flow path is covered by deposited material, a level of a sensor output signal of the deposited material sensor 21-$i$ changes.

The photoelectronic sensor includes a light-emitting portion and a light-receiving portion and is configured such that light emitted from the light-emitting portion toward an object is reflected by or passes through the object and enters the light-receiving portion. Generally, in a case of a photoelectronic sensor, when deposited material reaches a certain thickness and completely blocks incident light to the photoelectronic sensor, since a thickness can no longer be detected, the photoelectronic sensor can no longer be used as a thickness gauge.

FIG. 5 is a diagram for explaining a deposition level of deposited material in the deposited material sensor 21-$i$. As shown in FIG. 5, a thickness of the deposited material increases with process time from a deposition level A to a deposition level D towards a rotor wall surface 3$c$. Each deposited material sensor 21-$i$ only detects a presence or absence of the deposited material on the deposited material sensor 21-$i$ without detecting the thickness of the deposited material. In other words, a level of a sensor output signal of the deposited material sensor 21-$i$ changes abruptly at a time point (for example, the deposition level A) at which the thickness of the deposited material is low.

Figure 6:
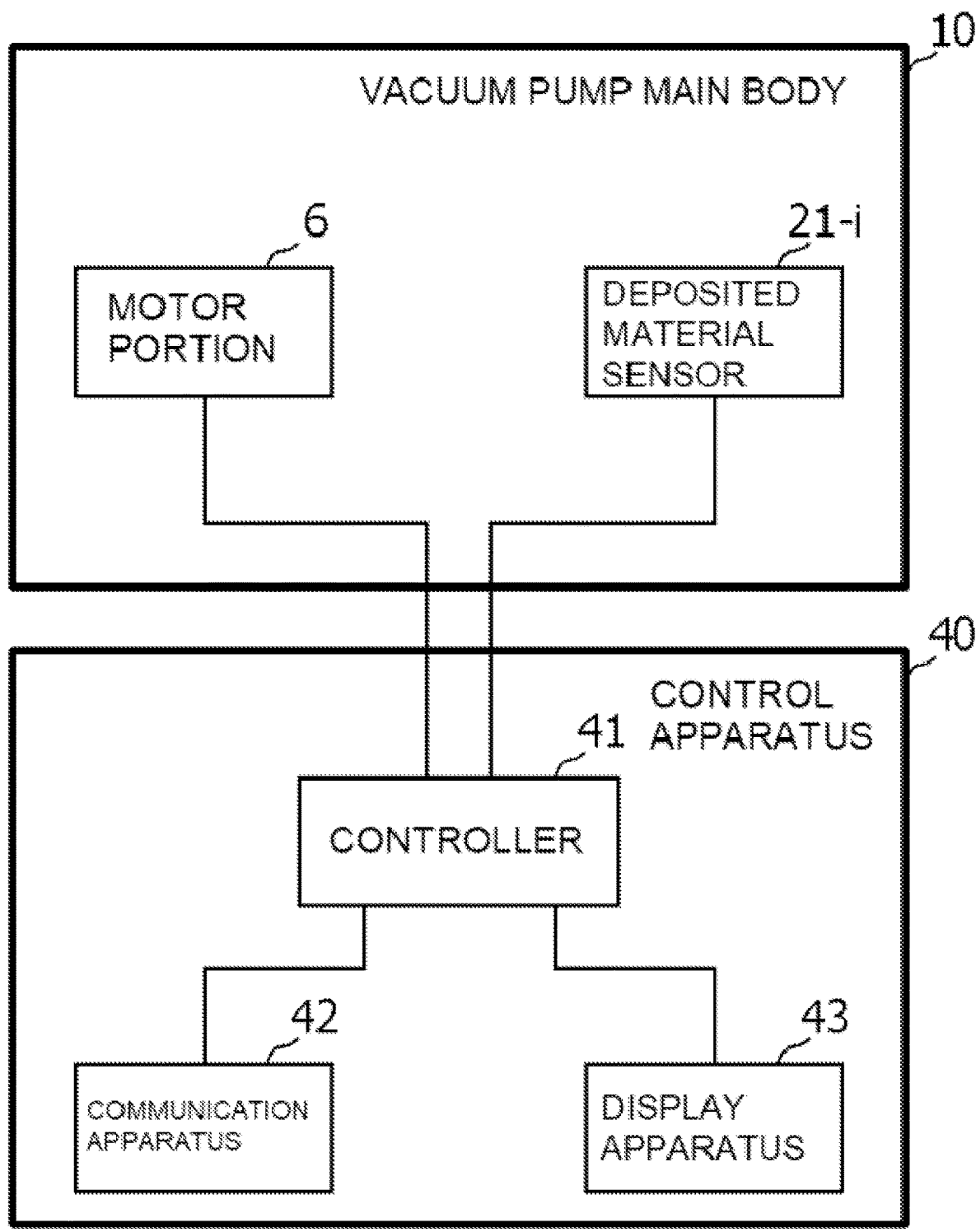
FIG. 6 is a block diagram showing an electric configuration of a vacuum pump according to the first embodiment.

FIG. 6 is a block diagram showing an electric configuration of the vacuum pump according to the first embodiment. The vacuum pump according to the first embodiment further includes a control apparatus 40 that electrically controls the vacuum pump main body 10. The control apparatus 40 may be built into the vacuum pump or the vacuum pump main body 10 and the control apparatus 40 may be respectively configured as attachable and detachable separate bodies.

As shown in FIG. 6, the control apparatus 40 includes a controller 41, a communication apparatus 42, and a display apparatus 43. The controller 41 includes a processor and the like and controls the motor portion 6 of the vacuum pump main body 10, acquires a sensor output signal of the deposited material sensor 21-$i$ of the vacuum pump main body 10, and detects a maintenance time based on a detection state (in other words, the sensor output signal) of the deposited material sensor 21-$i$. The communication apparatus 42 is a peripheral interface or the like, and the display apparatus 43 is various indicators or the like. When the controller 41 detects a maintenance time, the controller 41 notifies a user using the communication apparatus 42 and the display apparatus 43 that a maintenance time has been detected.

It should be noted that the controller 41 makes a binary determination of "deposited material present" or "deposited material absent" based on a sensor output signal of the deposited material sensor 21-$i$. The controller 41 may make a binary determination with respect to the sensor output signal of the deposited material sensor 21-$i$ based on a threshold or the deposited material sensor 21-$i$ may output a binary signal as the sensor output signal.

In addition, when a plurality of deposited material sensors 21-1 to 21-N are arranged as in the present first embodiment, the plurality of deposited material sensors 21-1 to 21-N are electrically connected to the controller 41, and the controller 41: (a) selects, from the plurality of deposited material sensors 21-1 to 21-N, one specific sensor (a deposited material sensor arranged at a position where a thickness of deposited material at the predetermined flow path position assumes a predetermined thickness corresponding to maintenance time when a detection state changes from deposited material absent to deposited material present); and (b) detects a maintenance time based on the detection state of the selected specific sensor. In other words, the controller 41 detects a maintenance time when the specific sensor detects "deposited material present".

Since a gas passing through the flow path changes depending on a process in which the vacuum pump is used, a distribution of a thickness of deposited material such as that shown in FIG. 3 may also change depending on the process. Therefore, among the plurality of deposited material sensors 21-1 to 21-N, the deposited material sensor 21-i arranged at a position where the thickness of the deposited material assumes a thickness of the deposited material that is a detection lower limit of the deposited material sensor when the thickness of the deposited material at a cause occurrence expected position reaches the maintenance time thickness is selected and used to detect the maintenance time.

Such a deposited material sensor 21-i to be selected is determined by, for example, an experiment and set to the controller 41. Alternatively, for example, a correlation between a thickness of the deposited material at the cause occurrence expected position and a thickness of the deposited material at each arrangement position of the deposited material sensors 21-1 to 21-N may be specified during maintenance, in which case such a deposited material sensor 21-i to be selected may be specified based on the correlation and set to the controller 41.

In addition, when the controller 41 detects a deposited material sensor 21-i of which the detection state had changed from deposited material absent to deposited material present among the plurality of deposited material sensors 21-1 to 21-N, the controller 41 may notify a maintenance time at a notification level that corresponds to the detected deposited material sensor 21-i. For example, with respect to three deposited material sensors 21-1 to 21-3, when the controller 41 detects a change from deposited material absent to deposited material present with the deposited material sensors 21-1 to 21-3 in a descending order of proximity to the predetermined flow path position described above, the controller 41 sequentially notifies a maintenance time at a notification level "caution", a notification level "warning", and a notification level "alarm".

Next, operation of the vacuum pump according to the first embodiment will be described.

By connecting a chamber or the like to the inlet port 7 of the vacuum pump, electrically connecting the control apparatus 40 to the vacuum pump main body 10 (the motor portion 6 or the like), and having the control apparatus 40 (the controller 41) operate the motor portion 6, the rotor shaft 4 rotates and the rotor blade portion 3a also rotates. Accordingly, the rotor blade portion 3a and the stator blade 2 cause a gas particle that comes flying via the inlet port 7 to pass through the flow path to be exhausted through the outlet port 9.

In addition, due to a gas to be exhausted, deposited material precipitates in respective parts of the flow path and a thickness of the deposited material gradually increases with process time. An increase rate of the thickness of the deposited material is high at the predetermined flow path position described above but the increase rate of the thickness of the deposited material is low at the arrangement position of the deposited material sensor 21-i.

Subsequently, when the thickness of the deposited material at the predetermined flow path position reaches the maintenance time thickness, the thickness of the deposited material at the arrangement position of the deposited material sensor 21-i reaches a thickness of a lower limit of deposited material detection and the detection state of the deposited material sensor 21-i changes from deposited material absent to deposited material present. When the detection state of the deposited material sensor 21-i changes from deposited material absent to deposited material present, the controller 41 detects the change in the detection state and notifies a maintenance time.

As described above, according to the first embodiment, the deposited material sensor 21-i is arranged, in the flow path of a gas from the inlet port 7 to the outlet port 9, on an upstream side or a downstream side of a predetermined flow path position where a cause of disruption to operation of the vacuum pump is to occur. In addition, the deposited material sensor 21-i detects a presence or absence of deposited material at the arrangement position of the deposited material sensor, and the arrangement position of the deposited material sensor 21-i is a position where a thickness of the deposited material at the predetermined flow path position assumes a predetermined thickness that corresponds to a maintenance time of maintenance for suppressing the cause when a detection state of the deposited material sensor 21-i changes from deposited material absent to deposited material present.

Accordingly, the deposited material sensor 21-i arranged at a position that differs from a flow path position where a cause of a disruption to operation of the vacuum pump is to occur detects a thickness of deposited material at that position just before the cause occurs.

Second Embodiment

In a second embodiment, a capacitance sensor is used as a deposited material sensor in place of the deposited material sensor (a photoelectronic sensor) in the first embodiment.

Figure 7A:
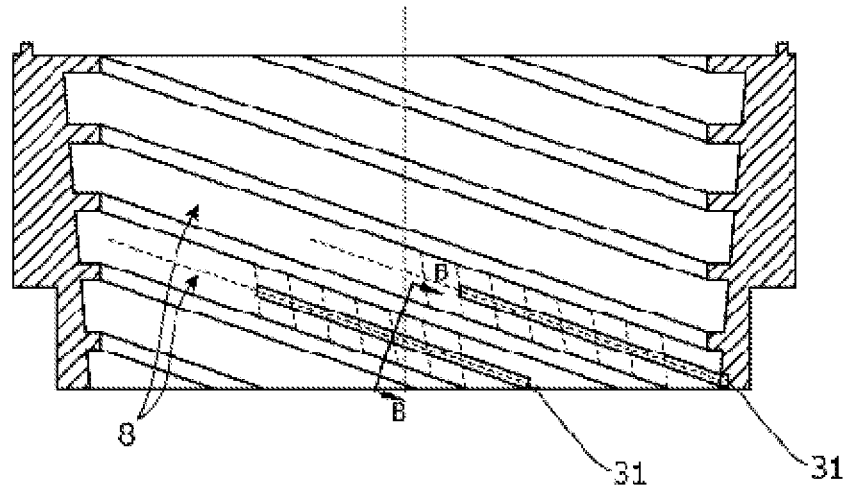
FIGS. 7A to 7C are diagrams showing an example of an arrangement position of a deposited material sensor in a second embodiment.
Figure 7B:
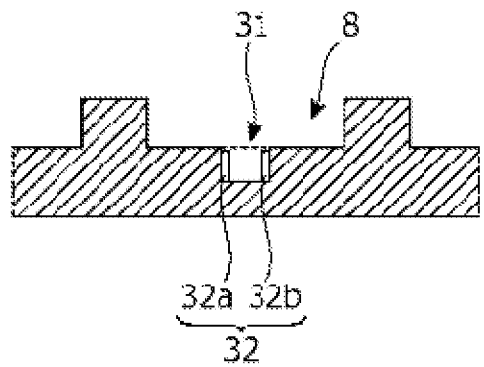
Figure 7C:
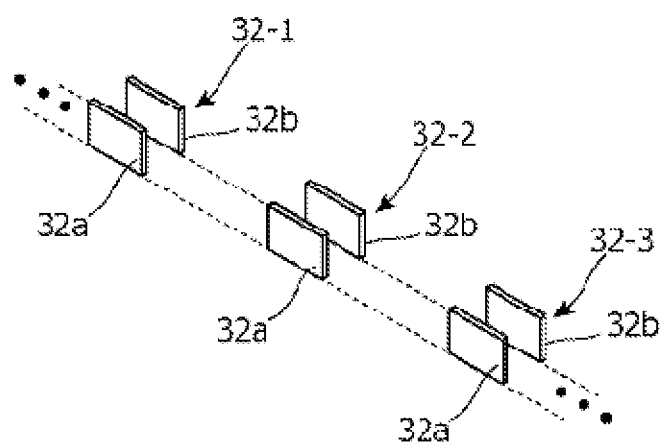

FIGS. 7A to 7C are diagrams showing an example of an arrangement position of the deposited material sensor in the second embodiment. FIG. 7A is a sectional view of a thread groove pump portion in the second embodiment, FIG. 7B is a sectional view of the thread groove pump portion taken along B-B in FIG. 7A, and FIG. 7C is a perspective view showing the deposited material sensor in the second embodiment.

In the second embodiment, as shown in FIG. 7A, a sensor groove 31 is further formed along the thread groove 8 on a bottom surface of the thread groove 8 and, as shown in FIG. 7B, a pair of electrodes 32a and 32b is arranged as a capacitance deposited material sensor 32 on opposing side surfaces of the sensor groove 31. Furthermore, in the second embodiment, a plurality of deposited material sensors 32-1 to 32-N (N>1) are arranged in the sensor groove 31 formed in one or a plurality of thread grooves 8 at, for example, regular intervals.

Since other components and operations of the vacuum pump according to the second embodiment are similar to those of the first embodiment, a description thereof will be omitted.

Third Embodiment

Figure 8A:
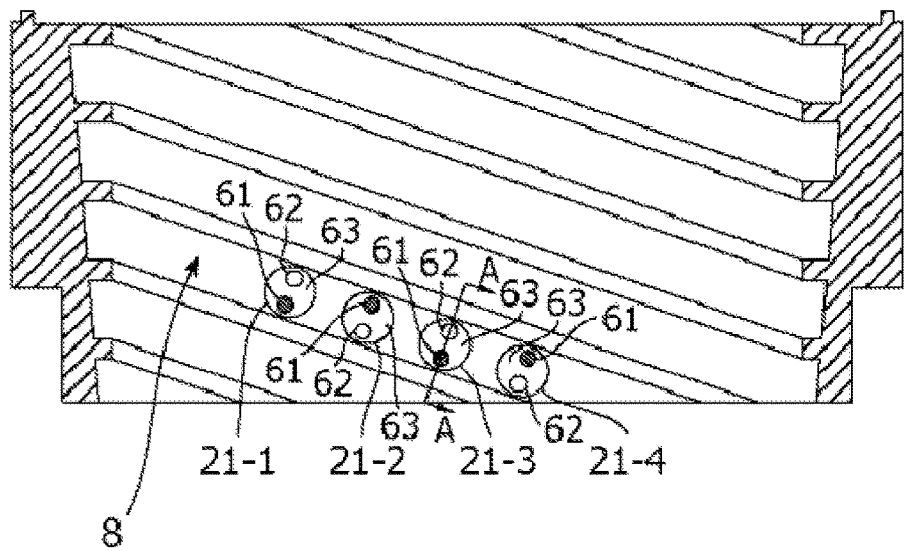
FIGS. 8A and 8B are diagrams showing an example of a deposited material sensor in a third embodiment.
Figure 8B:
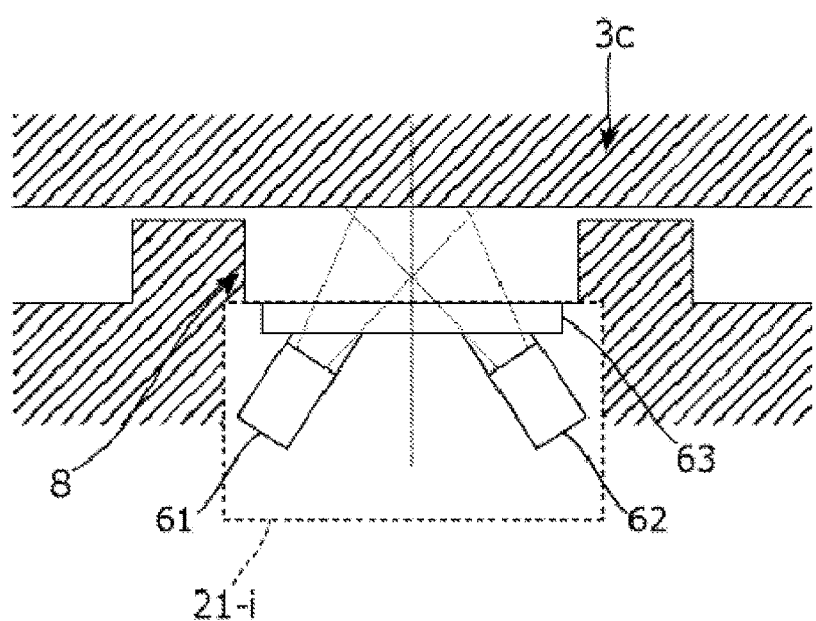

FIGS. 8A and 8B are diagrams showing an example of a deposited material sensor in a third embodiment. FIG. 8A is a diagram showing an upper surface of the deposited material sensor arranged in a thread groove pump portion in the third embodiment, and FIG. 8B is a sectional view of the thread groove pump portion taken along A-A in FIG. 8A and is a diagram showing a cross section of the deposited material sensor in the third embodiment. In the third embodiment, a deposited material sensor 21-$i$ such as that shown in FIGS. 8A and 8B is used.

The deposited material sensor 21-$i$ according to the third embodiment is a photoelectronic sensor, and when an end portion of the deposited material sensor 21-$i$ being exposed in the flow path is covered by deposited material, a level of a sensor output signal of the deposited material sensor 21-$i$ changes. For example, as shown in FIGS. 8A and 8B, the deposited material sensor 21-$i$ includes a light source 61 as a light-emitting portion, an optical sensor 62 as a light-receiving portion, and a window 63 that constitutes an end portion of the deposited material sensor 21-$i$. Examples of the light source 61 include an LED element and a laser oscillator and examples of the optical sensor 62 include a phototransistor, a photodiode, a photoconductive cell (such as a CdS cell), a photovoltaic cell, a CCD (Charge Coupled Device), a CMOS (Complementary Metal Oxide Semiconductor) sensor, and an infrared sensor. Alternatively, the light source 61 and the optical sensor 62 may be arranged outside of the pump, one end portion of two light-guiding members such as an optical fiber may be arranged in place of the light source 61 and the optical sensor 62, another end portion of the two light-guiding members may be arranged so as to respectively face the light source 61 and the optical sensor 62, and light guidance between the light source 61 and the optical sensor 62 and the thread groove 8 may be performed by the light-guiding members.

In a state where there is hardly any deposited material on the window 63, light from the light source 61 proceeds to the rotor wall surface 3$c$ via the window 63, reflects off the rotor wall surface 3$c$, and enters the optical sensor 62 via the window 63. On the other hand, when the deposited material reaches a certain thickness on the window 63, light from the light source 61 is blocked by the deposited material and does not proceed to the rotor wall surface 3$c$, and an amount of light incident to the optical sensor 62 decreases. Therefore, when an end portion of the deposited material sensor 21-$i$ being exposed in the flow path is covered by the deposited material, a level of a sensor output signal of the deposited material sensor 21-$i$ (the optical sensor 62) changes. Accordingly, each of the plurality of deposited material sensors 21-1 to 21-N detects a presence or absence of the deposited material at the arrangement position of the deposited material sensor.

Since other components and operations of the vacuum pump according to the third embodiment are similar to those of the first embodiment, a description thereof will be omitted.

Fourth Embodiment

Figure 9A:
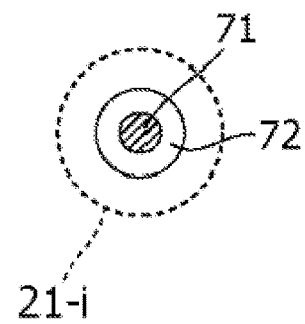
FIGS. 9A and 9B are diagrams showing an example of a deposited material sensor in a fourth embodiment.
Figure 9B:
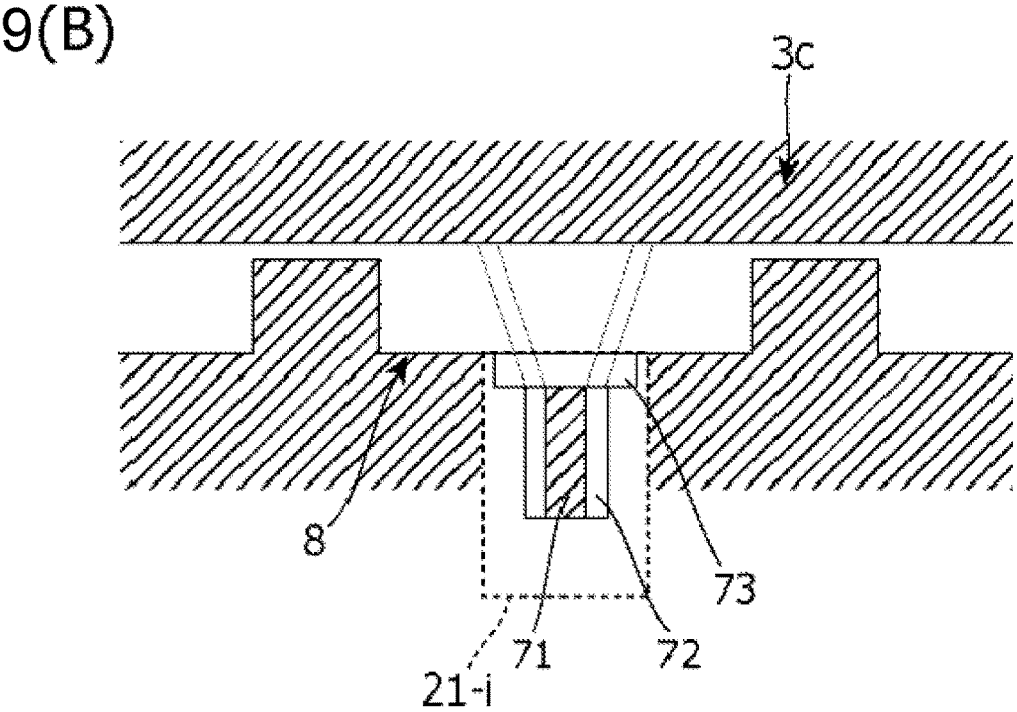

FIGS. 9A and 9B are diagrams showing an example of a deposited material sensor in a fourth embodiment. FIG. 9A is a diagram showing an upper surface of the deposited material sensor in the fourth embodiment, and FIG. 9B is a diagram showing a cross section of the deposited material sensor in the fourth embodiment. In the fourth embodiment, a deposited material sensor 21-$i$ such as that shown in FIGS. 9A and 9B is used.

The deposited material sensor 21-$i$ according to the fourth embodiment is a photoelectronic sensor in a similar manner to the deposited material sensors 21-$i$ in the first and third embodiments, and when an end portion of the deposited material sensor 21-$i$ being exposed in the flow path is covered by deposited material, a level of a sensor output signal of the deposited material sensor 21-$i$ changes. For example, as shown in FIGS. 9A and 9B, the deposited material sensor 21-$i$ includes a light-emitting portion 71, a light-receiving portion 72, and a window 73 that constitutes an end portion of the deposited material sensor 21-$i$. As shown in FIGS. 9A and 9B, the light-receiving portion 72 is arranged in a periphery of the light-emitting portion 71, and the light-receiving portion 72 and the light-emitting portion 71 are concentrically arranged.

Since other components and operations of the vacuum pump according to the fourth embodiment are similar to those of the first embodiment, a description thereof will be omitted.

Fifth Embodiment

Figure 10:
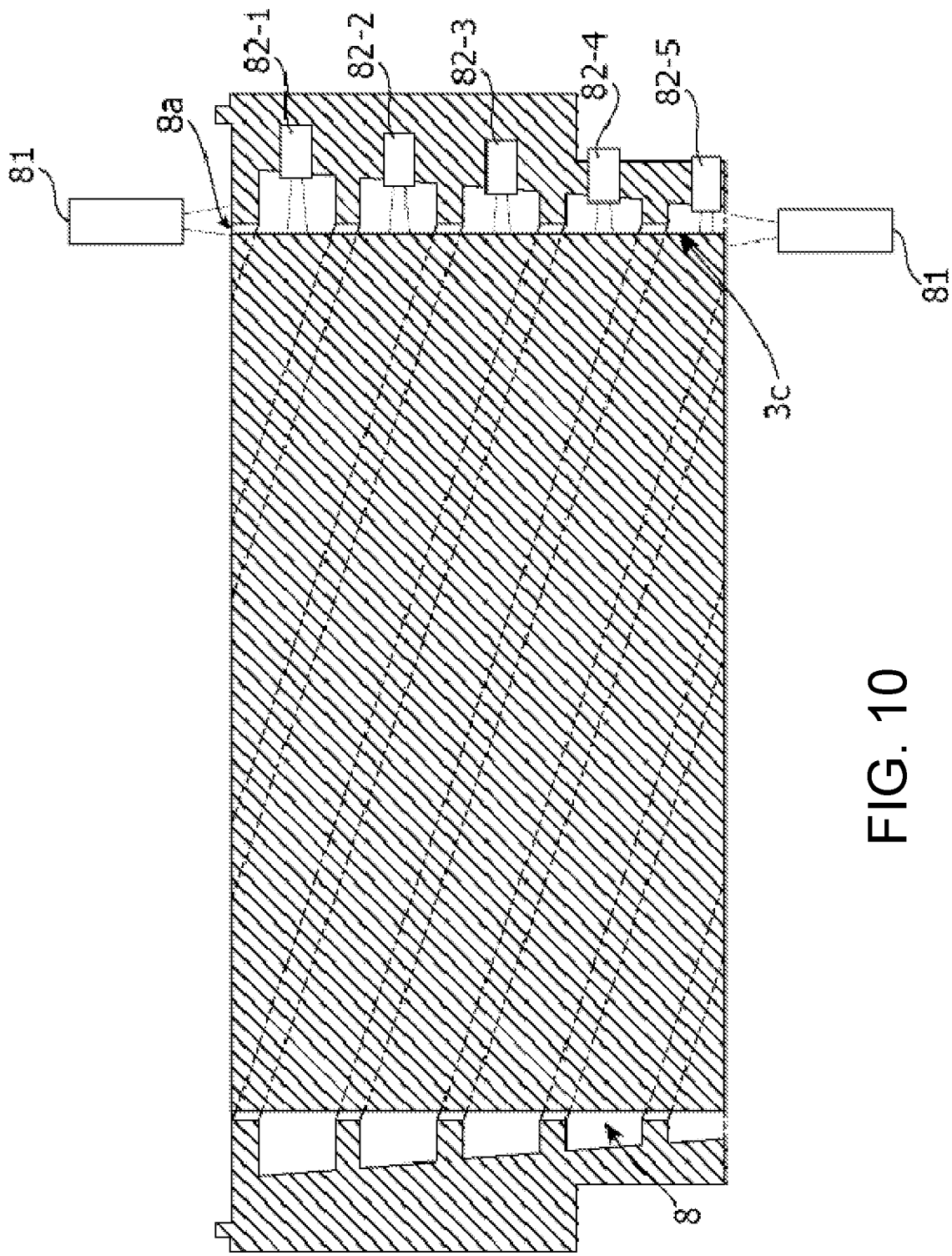
FIG. 10 is a diagram showing an example of a deposited material sensor in a fifth embodiment.

FIG. 10 is a diagram showing an example of a deposited material sensor in a fifth embodiment. A deposited material sensor 21-$i$ according to the fifth embodiment is a photoelectronic sensor and includes one or a plurality of light sources 81 that are shared by a plurality of deposited material sensors 21-1 to 21-N and an optical sensor 82-$i$ that is exposed in a flow path. The light source 81 is arranged at an upper end and/or a lower end of a thread groove pump portion and irradiates, via a gap 8$a$ between a rotor wall surface 3$c$ and a stator (a thread groove 8) in the thread groove pump portion, the rotor wall surface 3$c$ and the thread groove 8 with light.

In addition, at least one of the plurality of deposited material sensors 82-1 to 82-N is arranged on an upstream side or a downstream side of a predetermined flow path position where a cause of disruption to operation of the vacuum pump such as described above is to occur. Each of the plurality of deposited material sensors 82-1 to 82-N generates a sensor output signal that indicates a presence or absence of deposited material at the arrangement position of the deposited material sensor. When the end portion of the optical sensor 82-$i$ is not covered by the deposited material, the light is reflected by a rotor surface or the like and enters the optical sensor 82-$i$. On the other hand, when the end portion of the optical sensor 82-$i$ is covered by the deposited material, the light no longer enters the optical sensor 82-$i$. Therefore, when the end portion of the deposited material sensor 82-$i$ is covered by the deposited material, a level of a sensor output signal of the deposited material sensor 21-$i$ (the optical sensor 82-$i$) changes.

Since other components and operations of the vacuum pump according to the fifth embodiment are similar to those of the first embodiment, a description thereof will be omitted.

It should be understood that various changes and modifications to the preferred embodiments described above will become apparent to those skilled in the art. Such changes and modifications may be made without departing from the spirit and scope of the present invention and without diminishing its intended advantages. Accordingly, such changes and modifications are intended to be encompassed by the appended claims.

For example, while the arrangement positions of the deposited material sensors 21-$i$ and 32-$i$ are on an upstream side of the predetermined flow path position described above (in this case, an outlet portion of the thread groove pump portion) in the first and second embodiments described above, alternatively, the arrangement positions may be on a downstream side. In addition, in the first and second embodiments described above, the deposited material sensors 21-$i$ and 32-$i$ may be arranged at different positions where, due to the flow path becoming narrow at the predetermined flow path position described above, a state (partial pressure and temperature) of the deposited material component described above moves from a gaseous region to a solid region in a phase diagram of the deposited material component and moves approximately onto a sublimation curve when a thickness of deposited material at the predetermined flow path position described above reaches a thickness that corresponds to a maintenance time.

Furthermore, while examples in which the deposited material sensors 21-$i$ and 32-$i$ are arranged in a gas flow path of the thread groove pump portion have been mainly described in the first and second embodiments described above, the arrangement positions of the deposited material sensors 21-$i$ and 32-$i$ are not limited thereto and, as long as a similar effect is produced, the arrangement positions may be arbitrary locations on an inner wall surface of a member (such as an upper end of a threaded grooved spacer, a ring that supports the stator blade 2, the casing 1, a base, a stator column, or the outlet port 9) which constitutes the gas flow path.

Moreover, while the vacuum pumps according to the first and second embodiments described above include a thread groove pump portion as an exhaust mechanism, alternatively, the vacuum pumps may include exhaust mechanisms adopting different systems (such as a Siegbahn type and a Gaede type) and, even in such cases, the deposited material sensors 21-$i$ and 32-$i$ are arranged at arbitrary locations where a similar effect is produced in a gas flow path of the vacuum pumps (including a gas flow path in the exhaust mechanisms adopting different systems).

For example, the present invention is applicable to a vacuum pump.

Although elements have been shown or described as separate embodiments above, portions of each embodiment may be combined with all or part of other embodiments described above.

Although the subject matter has been described in language specific to structural features and/or methodological acts, it is to be understood that the subject matter defined in the appended claims is not necessarily limited to the specific features or acts described above. Rather, the specific features and acts described above are described as example forms of implementing the claims.

What is claimed is:

1. A vacuum pump, comprising:
   a flow path of a gas from an inlet port to an outlet port; and
   a deposited material sensor that is arranged, in the flow path, on an upstream side or a downstream side of a predetermined flow path position where a cause of disruption to operation of the vacuum pump is to occur, wherein
   the deposited material sensor is configured to detect a presence or absence of deposited material at an arrangement position of the deposited material sensor without being configured to detect a thickness of the deposited material at the arrangement position, and
   the arrangement position of the deposited material sensor is a position where a thickness of the deposited material at the predetermined flow path position assumes a predetermined thickness that corresponds to a maintenance time of maintenance for suppressing the cause when a detection state of the deposited material sensor changes from deposited material absent to deposited material present.

2. The vacuum pump according to claim 1, further comprising:
   a rotor and a stator, wherein
   the deposited material sensor is arranged on a wall surface of the flow path in the stator that opposes the rotor.

3. The vacuum pump according to claim 1, further comprising:
   a thread groove pump portion, wherein
   the predetermined flow path position is an outlet portion of the thread groove pump portion, and
   the deposited material sensor is arranged on a bottom surface of a thread groove of the thread groove pump portion in the flow path.

4. The vacuum pump according to claim 1, further comprising:
   a controller, wherein
   the controller detects the maintenance time based on a detection state of the deposited material sensor.

5. The vacuum pump according to claim 4, comprising:
   a plurality of deposited material sensors that are arranged, in the flow path, on an upstream side or a downstream side of a predetermined flow path position where a cause of disruption to operation of the vacuum pump is to occur, wherein
   each of the plurality of deposited material sensors detects a presence or absence of deposited material at the arrangement position of the deposited material sensor, and
   the controller: (a) selects, from the plurality of deposited material sensors, one deposited material sensor arranged at a position where the thickness of the deposited material at the predetermined flow path position assumes a predetermined thickness that corresponds to the maintenance time when the detection state changes from deposited material absent to deposited material present; and (b) detects the maintenance time based on the detection state of the selected deposited material sensor.

6. The vacuum pump according to claim 5, wherein
   when the controller detects a deposited material sensor of which the detection state has changed from deposited material absent to deposited material present among the plurality of deposited material sensors, the controller notifies the maintenance time at a notification level that corresponds to the detected deposited material sensor.

\* \* \* \* \*